(12) United States Patent
Hsu

(10) Patent No.: US 6,813,816 B1
(45) Date of Patent: Nov. 9, 2004

(54) DEVICE TO REMOVE JOINT FROM AXLE OF VEHICLE

(75) Inventor: Allen Chun-Chih Hsu, Chang Hua Hsien (TW)

(73) Assignee: Yuan Cherng Industry Co., Ltd., Hang Hua (TW)

( * ) Notice: Subject to any disclaimer, the term of this patent is extended or adjusted under 35 U.S.C. 154(b) by 0 days.

(21) Appl. No.: 10/458,814

(22) Filed: Jun. 10, 2003

(51) Int. Cl.⁷ .............................................. B23P 19/02
(52) U.S. Cl. ...................................................... 29/252
(58) Field of Search .................. 29/252, 259, 281.1, 29/251, 258, 260, 266, 281.5, 898.07, 898.08

(56) References Cited

U.S. PATENT DOCUMENTS 4,783,893 A * 11/1988 Farino ........................ 29/426.5
4,821,391 A * 4/1989 Paterick ........................ 29/253
6,247,216 B1 * 6/2001 Rader, Jr. ..................... 29/252

* cited by examiner

Primary Examiner—Robert C. Watson
(74) Attorney, Agent, or Firm—Charles E. Baxley

(57) ABSTRACT

A device for removing joint from axle includes a seat disposed on a plate for supporting the axle, and a positioning device to position the axle on the seat. A follower includes a casing having a chamber to receive the joint of the axle and having a slot communicating with the chamber of the casing to slidably receive the axle. A moving device may move the follower away from the seat, to disengage the joint from the axle. A cover may be secured on the casing to prevent the joint from flying out of the casing. The positioning device includes a housing disposed on the plate, to support an actuator on the plate and above the seat. The housing includes a board having a passage to slidably receive the rod of the actuator.

15 Claims, 4 Drawing Sheets

DEVICE TO REMOVE JOINT FROM AXLE OF VEHICLE

BACKGROUND OF THE INVENTION

1. Field of the Invention

The present invention relates to a device, and more particularly to a device for removing joints from axles of vehicles.

2. Description of the Prior Art

Typical axles of vehicles, particularly the front transmission axles of vehicles each may comprise a joint, such as a constant velocity (CV) joint secured thereon. The joints have a good chance to be damaged after use, and have a good chance to be removed from the axles for repairing purposes.

However, the joints are solidly secured to the axles of the vehicles, and may not be easily disengaged or removed from the axles of vehicles. It normally takes a long time and a number of working processes to remove or to disengage the joints from the axles of vehicles by the workers.

The present invention has arisen to mitigate and/or obviate the afore-described disadvantages of the conventional processes to remove or to disengage the joints from the vehicle axles.

SUMMARY OF THE INVENTION

The primary objective of the present invention is to provide a device for easily and quickly removing or disengaging joints from axles of vehicles without much labor work.

In accordance with one aspect of the invention, there is provided a device for removing joint from axle, the device comprising a device for removing joint from axle, the device comprising a plate, a seat disposed on the plate for supporting the axle, a positioning device for positioning the axle on the seat, a follower including a casing having a chamber formed therein for receiving the joint of the axle therein, and having a slot formed therein and communicating with the chamber of the casing for slidably receiving the axle, and a moving device for moving the follower away from the seat, to disengage the joint from the axle.

The follower includes a block coupled to the casing, and the moving device includes an actuator having a rod coupled to the block, to move the block and the casing of the follower relative to the seat.

The casing includes at least one ear extended therefrom, the follower includes at least one pole secured between the block and the ear, to form a space between the block and the casing.

The follower includes a cover secured on the casing, to enclose the chamber of the casing, and to prevent the joint from flying out of the casing.

The seat includes a notch formed therein to stably receive the axle. The positioning device includes an actuator having a rod extendible toward the seat, to clamp the axle between the seat and the rod. The rod includes a lower portion having a notch formed therein to receive the axle.

The positioning device includes a housing disposed on the plate, to support the actuator on the plate and above the seat. The housing includes a board having a passage formed therein to slidably receive the rod of the actuator.

The housing includes two legs disposed beside the seat, the board is disposed between the legs of the housing. Each of the legs of the housing includes a flap extended therefrom and secured to the plate with at least one fastener.

The plate further includes two tracks provided thereon to slidably receive the flaps of the legs. Each of the tracks includes a channel formed therein to receive the flaps of the legs respectively.

Each of the legs of the housing includes a depression formed therein to receive the seat, and to position the seat relative to the housing. Each of the legs of the housing includes at least one bulge extended therefrom to engage with the seat, and to position the seat relative to the housing.

The seat includes an upper portion having a groove formed therein, and the rod includes a lower portion having at least one cut formed therein to form a lower portion having a reduced thickness, and to allow the lower portion of the rod to engage into the groove of the seat.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
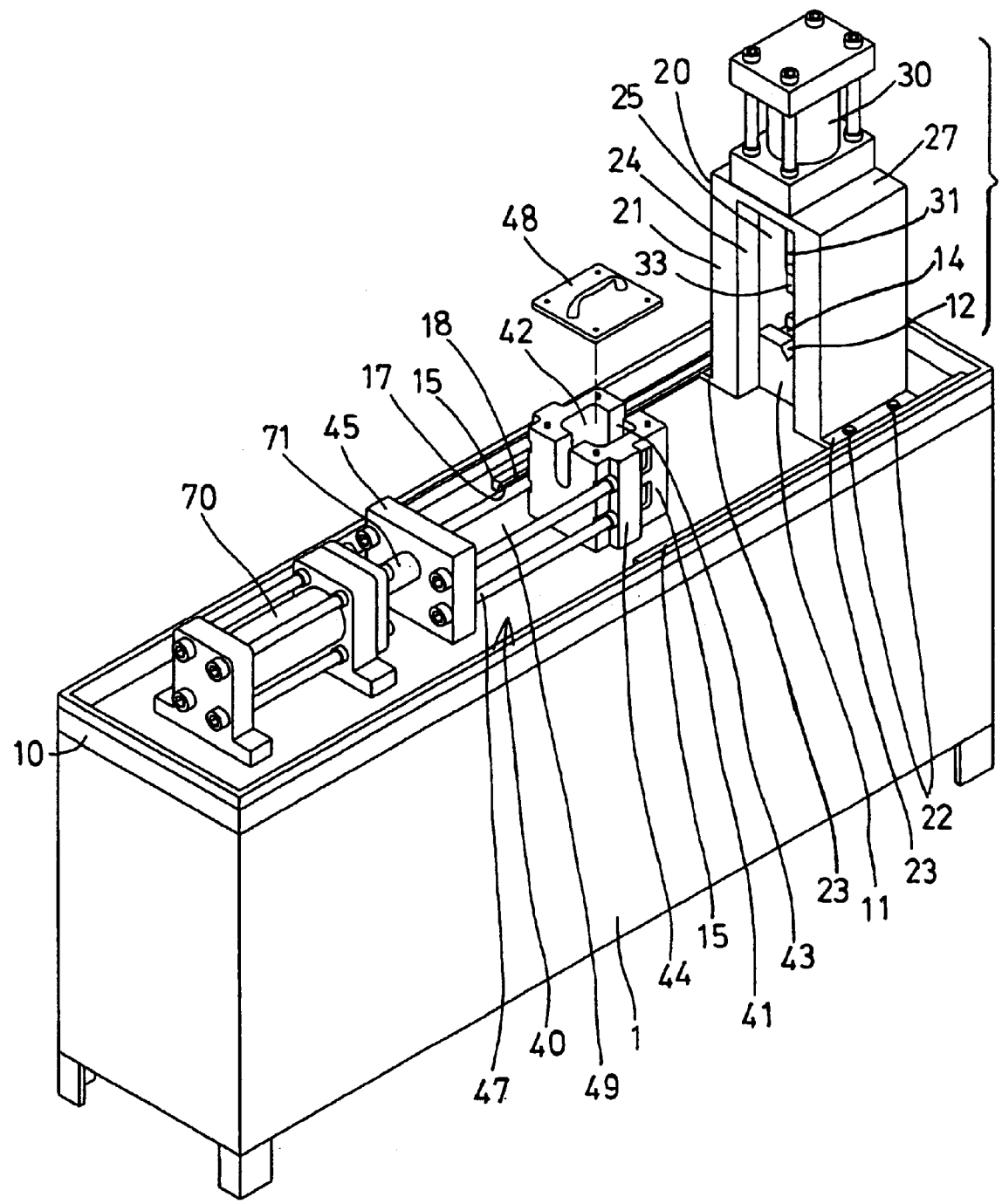
FIG. 1 is a partial exploded view of a device in accordance with the present invention, for removing joint from axle of vehicle.
Figure 2:
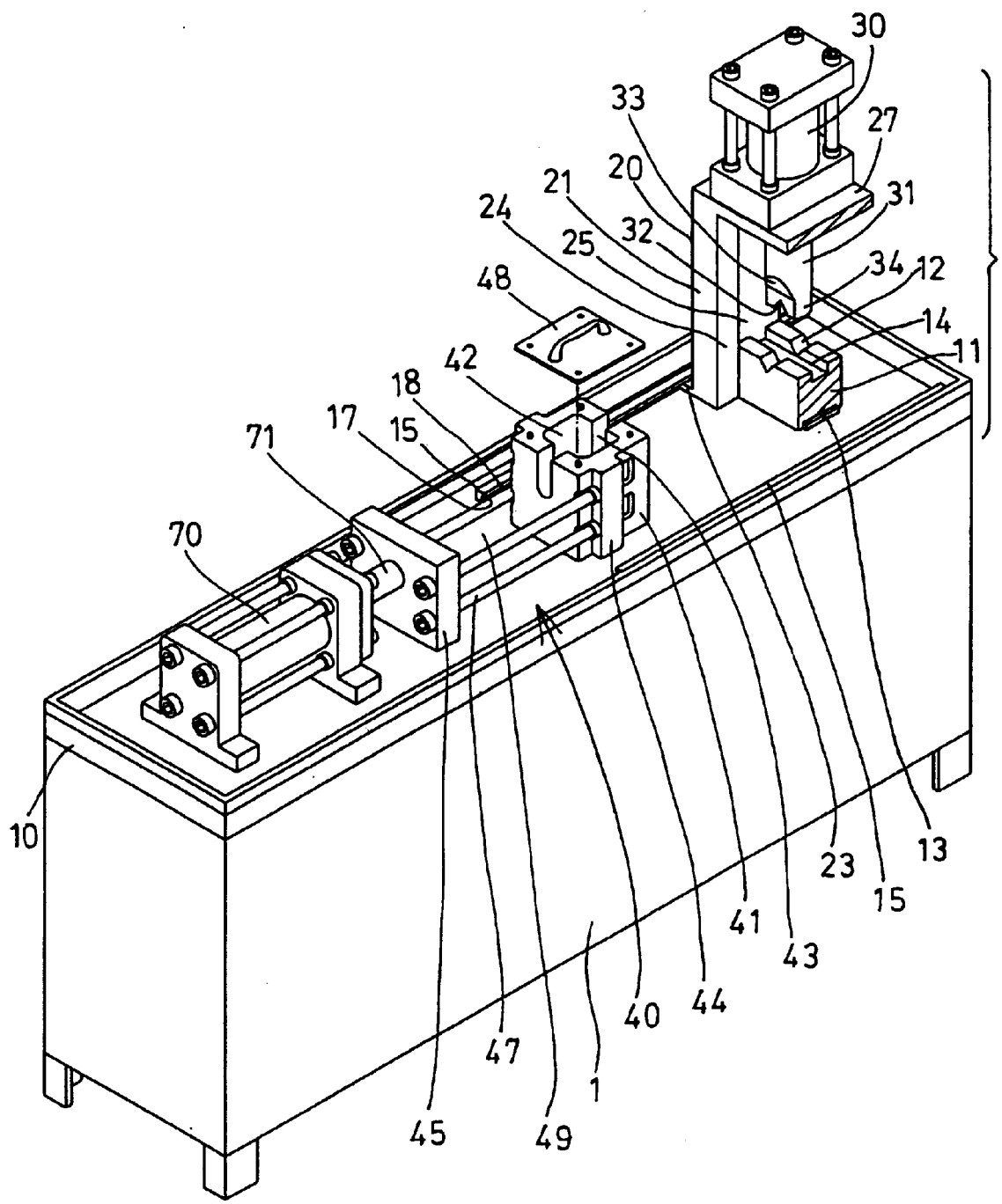
FIG. 2 is a partial exploded view of the device, similar to FIG. 1, in which a portion of the device is cut off for showing the inner structure of the device.

Referring to the drawings, and initially to FIGS. 1 and 2, a device in accordance with the present invention is provided for easily and quickly removing or disengaging joints 52, such as the CV joints 52 from axles 50 (FIGS. 3, 4) of vehicles without much labor work.

Figure 3:
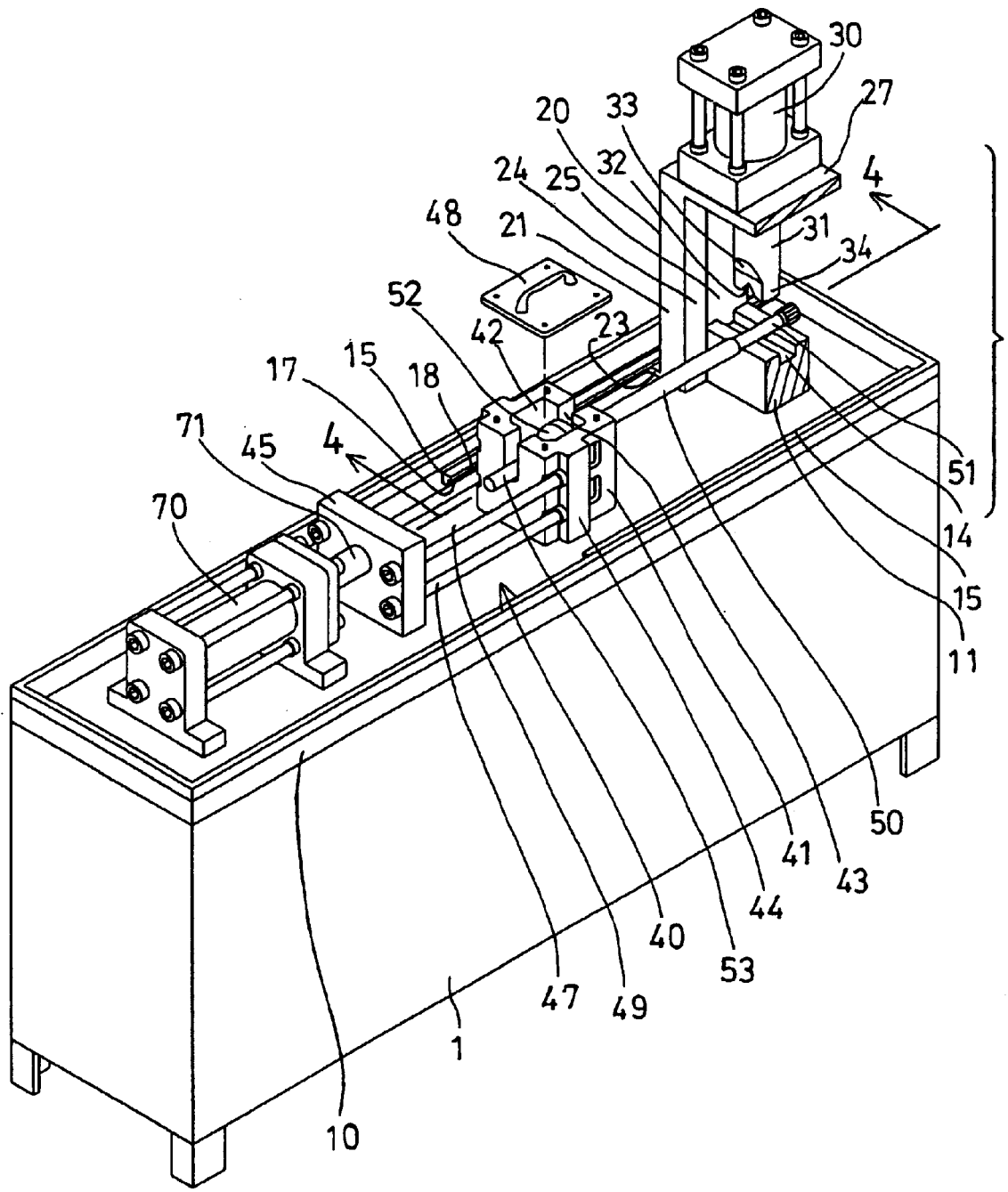
FIG. 3 is a partial exploded view of the device, similar to FIGS. 1 and 2, illustrating the operation of the device.
Figure 4:
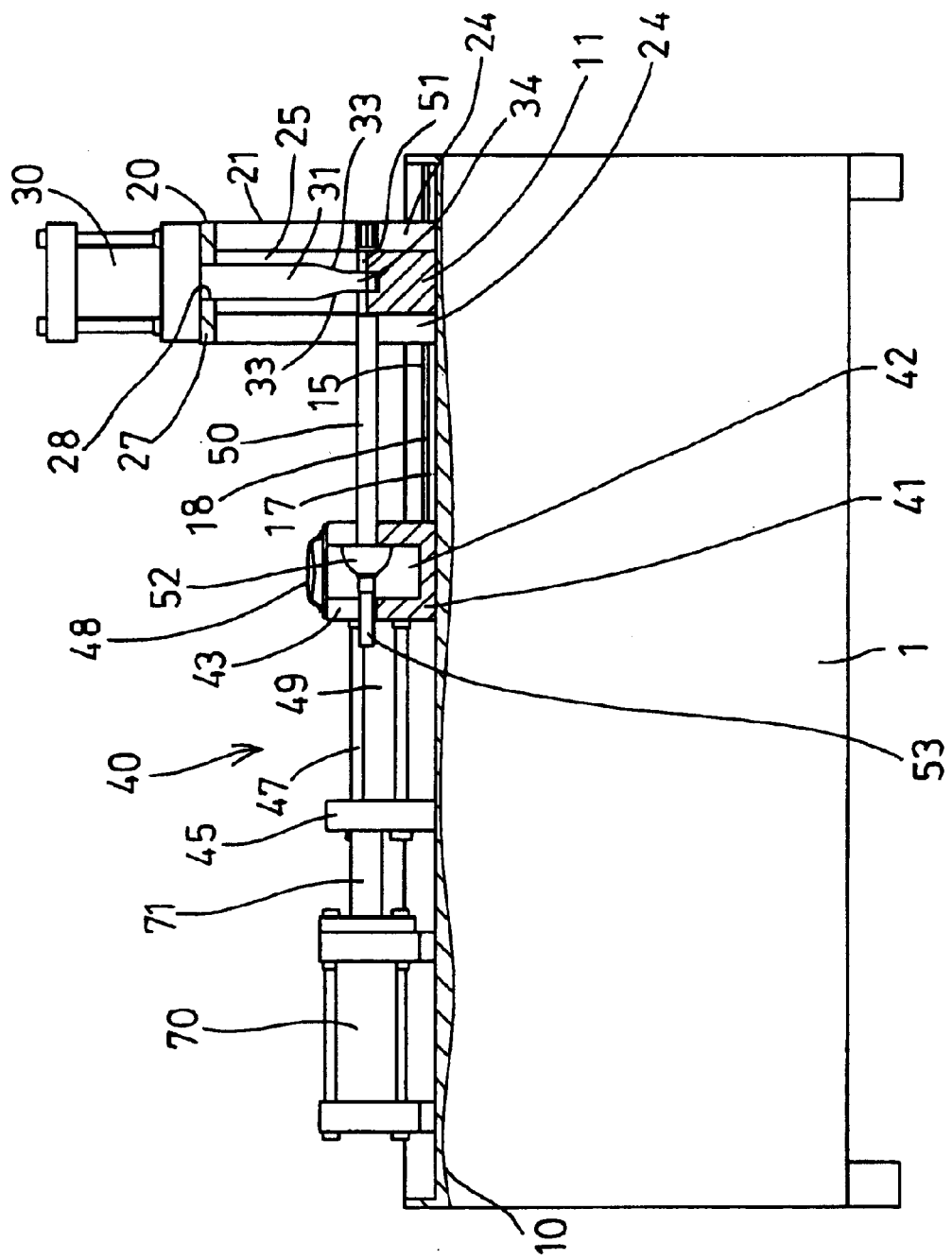
FIG. 4 is a partial cross sectional view taken along lines 4—4 of FIG. 3, illustrating the operation of the device.

The device comprises a table plate 10 disposed or supported on top of a base 1, and including a seat 11 disposed or secured on the middle portion of one or front end thereof with such as fasteners or latches 13 (FIG. 2) or the like. The seat 11 includes a notch 12, such as a V-shaped notch 12 formed in the upper portion thereof, and parallel to the plate 10, or parallel to the longitudinal direction of the plate 10, for receiving or supporting a first or front end portion 51 of the axle 50 (FIGS. 3, 4).

The seat 10 further includes a groove 14 formed in the upper portion thereof, and preferably perpendicular to the plate 10, or perpendicular to the notch 12 of the plate 10, and thus preferably perpendicular to the axle 50.

The plate 10 further includes one or more, such as two tracks 15 disposed or supported on top thereof, and preferably disposed beside the seat 11, and parallel to the plate 10, or parallel to the longitudinal direction of the plate 10. The tracks 15 each includes a channel 17 formed therein and defined by a flange 18 which facing toward the seat 11.

A housing 20 includes two legs 21 secured on top of the plate 10 with such as fasteners 22. For example, each of the legs 21 includes a flap 23 extended laterally and outwardly from the bottom thereof and slidably engaged in the respective channels 17 of the tracks 15, to guide the housing 20 to be adjusted relative to the plate 10, before the flaps 23 are secured to the plate 10 with the fasteners 22.

The sliding engagement of the flaps 23 of the housing 20 in the respective channels 17 of the tracks 15 may further prevent the housing 20 from being moved relative to the plate 10, and to allow the housing 20 to be further solidly secured and supported on the plate 10. The legs 21 of the housing 20 are arranged beside the seat 11, or the seat 11 is disposed or retained between the legs 21 of the housing 20.

Each of the legs 21 of the housing 20 includes one or more, such as two ribs or bulges 24 extended therefrom to form or define a depression 25 between the bulges 24. The seat 11 may be partially received in the depressions 25 of the legs 21, and/or the bulges 24 of the legs 21 may engage with the seat 11, in order to solidly retain or position the seat 11 between the legs 21 of the housing 20, and to prevent the seat 11 from being moved relative to the housing 20.

The housing 20 includes a board 27 provided on top thereof and disposed or coupled between the legs 21, and having an orifice or passage 28 formed therein (FIG. 4). A cylinder or an actuator 30 is secured on the board 27 or on top of the housing 20, and includes a rod 31 slidably engaged or extended through the passage 28 of the board 27 or of the housing 20 (FIG. 4).

The rod 31 includes a notch 32, such as a V-shaped notch 32 formed in the lower portion 34 thereof, and parallel to the notch 12 of the seat 11, and arranged above the notch 12 of the seat 11, for receiving the front end portion 51 of the axle 50 when the rod 31 is moved downwardly toward the seat 11 (FIG. 4), and thus for solidly retaining the front end portion 51 of the axle 50 on the seat 11.

The rod 31 preferably includes one or more, such as two recesses or cuts 33 formed in the lower portion thereof (FIG. 4), to form or define a lower portion 34 having a reduced thickness, and for allowing the lower portion 34 of the rod 31 to be received or engaged into the groove 14 of the seat 11, in order to solidly retain the front end portion 51 of the axle 50 between the rod 31 and the seat 11 (FIG. 4).

A follower 40 is slidably disposed or supported on the plate 10, and includes a casing 41 having a chamber 42 formed therein, to receive the CV joint 52 of the axle 50, and having a slot 43 formed therein and communicating with the chamber 42 of the casing 41, for slidably receiving the second or rear end portion 53 of the axle 50 (FIGS. 3, 4), and thus for retaining or anchoring the joint 52 of the axle 50 within the chamber 42 of the casing 41.

Another cylinder or actuator 70 is secured on the plate 10, and includes a rod 71 extended therefrom and secured to the follower 40, in order to move the follower 40 away from the seat 11 and the housing 20, and so as to remove the joint 52 from the axle 50, when the follower 40 away from the seat 11 and the housing 20 by the actuator 70.

The casing 41 includes one or more, such as two ears 44 extended laterally and outwardly therefrom. The follower 40 includes a block 45 secured to the rod 71 of the actuator 70, and one or more poles 47 secured between the block 45 and the casing 41, for forming or defining a space 49 between the block 45 and the casing 41, and for slidably receiving the rear end portion 53 of the axle 50. For example, the poles 47 may be secured to the ears 44 of the casing 41.

In operation, as shown in FIGS. 3 and 4, the rear end portion 53 of the axle 50 may be received in the slot 43 of the casing 41, and the joint 52 of the axle 50 may be received in the chamber 42 of the casing 41, and the front end portion 51 of the axle 50 may be received in the notch 12 of the seat 11. The rod 31 of the actuator 30 may then be moved downwardly toward the seat 11, to solidly clamp or retain the front end portion 51 of the axle 50 between the rod 31 and the seat 11.

When the follower 30 is moved away from the seat 11 and the housing 20 by the actuator 70, the joint 52 may thus be forced to be disengaged or removed from the axle 50. A cover 48 may be secured on the casing 41, to enclose the chamber 42 of the casing 41, and to prevent the joint 52 from flying out of the casing 41 when the joint 52 is disengaged or removed from the axle 50.

It is to be noted that the seat 11 and the housing 20 may be adjusted along the tracks 15, according to the axles 50 of different lengths, for allowing the joint 52 of the axle 50 to be received in the chamber 42 of the casing 41, and for allowing the front end portion 51 of the axle 50 to be received in the notch 12 of the seat 11. The casing 41 of the follower 40 may also be directly secured to the rod 71 of the actuator 70, instead of indirectly coupled to the rod 71 of the actuator 70 via the block 45 and the poles 47.

Accordingly, the device in accordance with the present invention may be used for easily and quickly removing or disengaging joints from axles of vehicles without much labor work.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for removing joint from axle, said device comprising:

a plate, a seat disposed on said plate for supporting the axle,
means for positioning the axle on said seat,
a follower including a casing having a chamber formed therein for receiving the joint of the axle therein, and having a slot formed therein and communicating with said chamber of said casing for slidably receiving said axle, said follower including a cover secured on said casing, to enclose said chamber of said casing, and to prevent the joint from flying out of said casing, and
means for moving said follower away from said seat, to disengage the joint from the axle.

2. The device as claimed in claim 1, wherein said follower includes a block coupled to said casing, and said moving means includes an actuator having a rod coupled to said block, to move said block and said casing of said follower relative to said seat.

3. A device for removing joint from axle, said device comprising:

a plate, a seat disposed on said plate for supporting the axle, means for positioning the axle on said seat, a follower including a casing having a chamber formed therein for receiving the joint of the axle therein, and having a slot formed therein and communicating with said chamber of said casing for slidably receiving said axle, said casing includes at least one ear extended therefrom, said follower including a block coupled to said casing, and including at least one pole secured between said block and said at least one ear, to form a space between said block and said casing, and means for moving said follower away from said seat, to disengage the joint from the axle, said moving means including an actuator having a rod coupled to said block, to move said block and said casing of said follower relative to said seat.

4. The device as claimed in claim 1, wherein said seat includes a notch formed therein to receive the axle.

5. The device as claimed in claim 1, wherein said positioning means includes an actuator having a rod extendible toward said seat, to clamp the axle between said seat and said rod.

6. The device as claimed in claim 5, wherein said rod includes a lower portion having a notch formed therein to receive the axle.

7. The device as claimed in claim 5, wherein said positioning means includes a housing disposed on said plate, to support said actuator on said plate and above said seat.

8. The device as claimed in claim 7, wherein said housing includes a board having a passage formed therein to slidably receive said rod of said actuator.

9. A device for removing joint from axle, said device comprising:

a plate, a seat disposed on said plate for supporting the axle, means for positioning the axle on said seat, said positioning means including an actuator having a rod extendible toward said seat, to clamp the axle between said seat and said rod, and said positioning means including a housing disposed on said plate, to support said actuator on said plate and above said seat, said housing including two legs disposed beside said seat, and said housing including a board disposed between said legs of said housing, a follower including a casing having a chamber formed therein for receiving the joint of the axle therein, and having a slot formed therein and communicating with said chamber of said casing for slidably receiving said axle, and means for moving said follower away from said seat, to disengage the joint from the axle.

10. The device as claimed in claim 9, wherein each of said legs of said housing includes a flap extended therefrom and secured to said plate with at least one fastener.

11. The device as claimed in claim 10, wherein said plate further includes two tracks provided thereon to slidably receive said flaps of said legs.

12. The device as claimed in claim 11, wherein each of said tracks includes a channel formed therein to receive said flaps of said legs respectively.

13. The device as claimed in claim 9, wherein each of said legs of said housing includes a depression formed therein to receive said seat, and to position said seat relative to said housing.

14. The device as claimed in claim 9, wherein each of said legs of said housing includes at least one bulge extended therefrom to engage with said seat, and to position said seat relative to said housing.

15. A device for removing joint from axle, said device comprising:

a plate, a seat disposed on said plate for supporting the axle, said seat includes an upper portion having a groove formed therein, means for positioning the axle on said seat, said positioning means including an actuator having a rod extendible toward said seat, to clamp the axle between said seat and said rod, and said rod including a lower portion having at least one cut formed therein to form a lower portion having reduced thickness, and to allow said lower portion of said rod to engage into said groove of said seat, a follower including a casing having a chamber formed therein for receiving the joint of the axle therein, and having a slot formed therein and communication with said chamber of said casing for slidably receiving said axle, and means for moving said follower away from said seat, to disengage the joint from the axle.

* * * * *